April 25, 1967 B. D. LOUGHLIN 3,316,349
IMAGE ORTHICON BEAM CONTROL SYSTEM FOR AUTOMATICALLY
OPTIMIZING SIGNAL-TO-NOISE RATIO OF THE VIDEO OUTPUT
Filed July 5, 1963 2 Sheets-Sheet 1

United States Patent Office 3,316,349

Patented Apr. 25, 1967

3,316,349

IMAGE ORTHICON BEAM CONTROL SYSTEM FOR AUTOMATICALLY OPTIMIZING SIGNAL-TO-NOISE RATIO OF THE VIDEO OUTPUT

Bernard D. Loughlin, Huntington, N.Y., assignor to Hazeltine Research, Inc., a corporation of Illinois Filed July 5, 1963, Ser. No. 293,121
6 Claims. (Cl. 178—7.2)

The invention described herein was made in the performance of work under a NASA contract and is subject to the provisions of the National Aeronautics and Space Act of 1958, Public Law 85–568 (72 Stat. 426; 42 USC 2451), as amended.

The present invention relates to control apparatus for use in a signal generating system automatically to control a signal-to-noise performance characteristic of that system. The present invention finds use in signal generating systems of the type in which the magnitude of a flow of charged particles directed at a charge storage matrix is downwardly modulated in accordance with the neutralization of a charge pattern stored in the matrix. The modulated particle flow comprises the system's output. A conventional image orthicon is one example of such a signal generating system.

In signal generating systems of this type, the primary source of noise is so-called "shot" noise present in the particle flow. This noise is proportional to the magnitude of the unmodulated particle flow. Moreover, the desired signal output and noise output vary with the magnitude of the unmodulated particle flow so that optimum signal-to-noise performance obtains when a maximum input to the system produces 100 percent modulation of the particle flow. As a practical matter, typical peak information modulation of the particle flow is usually of the order of 30 to 50 percent; however it remains meaningful to speak of optimum signal-to-noise performance in relation to the latter levels of modulation.

In the operation of an image orthicon, the magnitude of the charged particle flow or electron beam used to neutralize the charge storage matrix is normally set at a high enough value completely to discharge the matrix in areas representative of the largest illumination input expected. As the peak level input illumination decreases, the percentage modulation of the electron beam decreases so that during very low level input illumination conditions, the peak magnitude of the signal modulated beam might not appreciably differ from the beam's unmodulated magnitude. Since the shot noise present for scenes of either high or low peak luminous intensity, corresponding to large or small signal modulation is determined by the unmodulated magnitude of the electron beam and therefore remains the same regardless of the size of the signal modulation, the signal-to-noise performance in the case of small signal modulation is noticeably poorer than in the case of large signal modulation.

Whenever signal generating systems of this type are used at unattended locations, for example, on super-highways for traffic control purposes or in unmanned satellites for weather observation, the signal-to-noise performance will vary adversely with the peak input illumination of the scene viewed unless some means for automatic regulation of the aforesaid system performance characteristic is provided. This regulation is especially desirable where twenty-four hour operation is contemplated, since the range of peak input illumination over this period will cause the signal-to-noise performance of the system to vary between extremes.

It is therefore an object of the present invention to provide control apparatus for a signal generating system of the type described which optimizes the signal-to-noise performance over a wide range of operating conditions.

A further object of the present invention is to provide a control apparatus for an image orthicon to optimize, by automatic regulation, the signal-to-noise ratio of the output signal over a wide range of peak input illumination levels.

In accordance with the present invention control apparatus for an image signal generating system including an image orthicon having a scanning electron beam, a control electrode for controlling the magnitude of the scanning electron beam, and an image signal modulated return electron beam comprises means for producing a reference modulation level in the return electron beam, means responsive to the return beam for developing an output signal jointly representative of the reference modulation level and the image signal modulation, means responsive to the output signal for deriving a control signal representative of the relative magnitudes of the reference modulation level and the peak image signal modulation level and means for coupling the control signal to the control electrode of the image orthicon for regulating the magnitude of the scanning electron beam to maintain a predetermined relationship between the reference modulation level and the peak image signal modulation level, thereby optimizing the signal-to-noise performance characteristic of the system.

For a better understanding of the present invention, together with other and further objects thereof, reference is had to the following description taken in connection with the accompanying drawings, and its scope will be pointed out in the appended claims.

Referring to the drawings.

Figure 1:
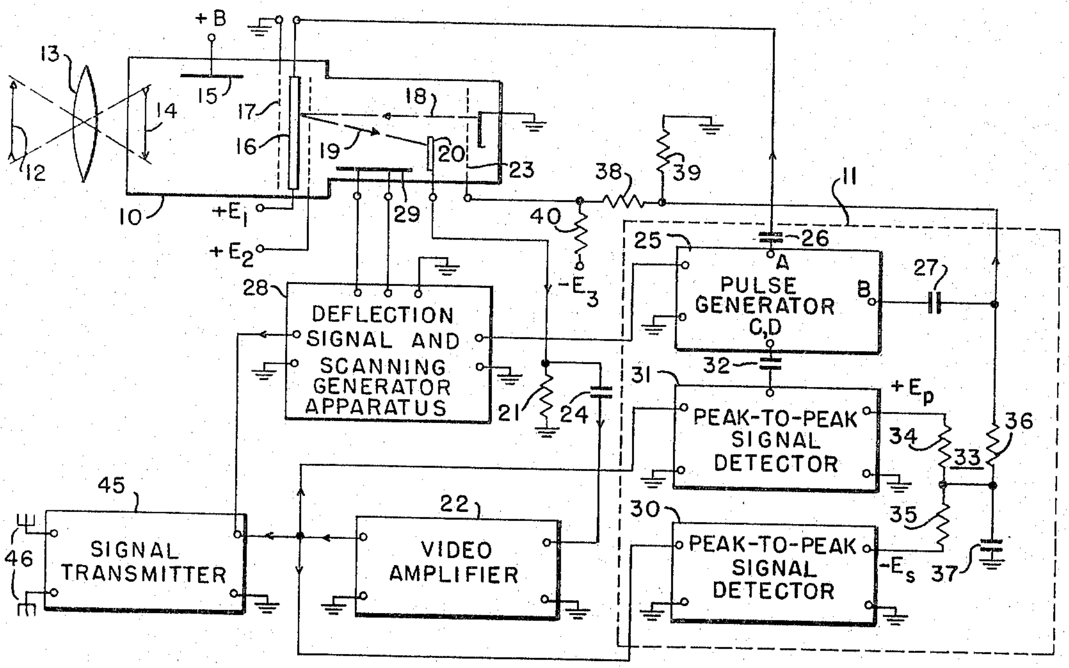
FIG. 1 is a diagram of a television transmitting system utilizing an image orthicon and including control apparatus constructed in accordance with the present invention.

The image orthicon 10 in FIG. 1 is preferably of conventional construction, for example as shown in Television Engineering Handbook, by D. G. Fink, McGraw-Hill, pages 5–61 and following. Briefly considering its operation, a scene 12 is focused by a lens 13 onto a photo-cathode 14 causing electrons to be emitted from the photo-cathode 14. The emitted electrons are accelerated by electrode 15 and impinge on a charge storage matrix target 16 causing the emission of secondary electrons which are captured by a target mesh 17, which is maintained at ground or a few volts negative with respect to the target 16. Because the secondary electrons are prevented from returning to the target 16, it is left with a net positive charge whose surface density is proportional to the luminous intensity of the scene 12.

To generate an output signal from orthicon 10 a scanning beam 18 is used to scan a raster on the reverse side of target 16. As the beam 18 passes over a positively charged portion of the target 16, sufficient electrons are deposited on the target 16 to neutralize the stored positive charge. The electrons not deposited are represented as a return beam 19 which is captured by an electron multiplier 20. The return beam 19 is a downwardly modulated flow of electrons which produces an output signal across resistance 21.

Figure 2:
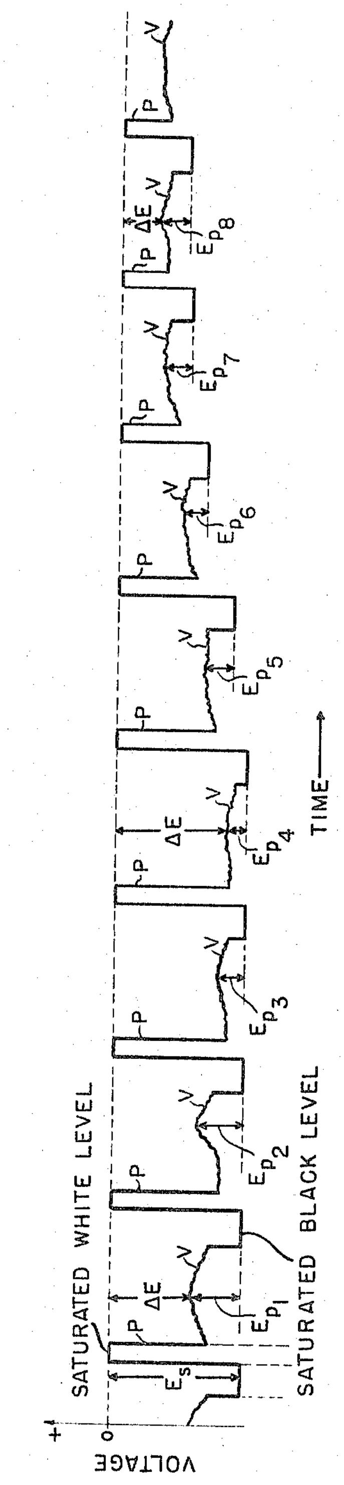
FIGS. 2 and 3 show voltage waveforms in related time occurrence useful to explain the operation of control apparatus in accordance with the present invention.

For purposes of explanation, the waveform of FIG. 2 is to be considered as showing, in inverted form, the voltage developed across resistance 21 as a result of successive scans of the same line in the raster developed on target 16. Thus, the regulation of signal-to-noise performance as hereinafter described takes place over several successive frames. However, by proper proportioning of the various time constants in control apparatus 11, it is possible to produce regulation over a frame, adjacent lines or portions of the same line.

Figures 3A, 3B, 3C, 3D:
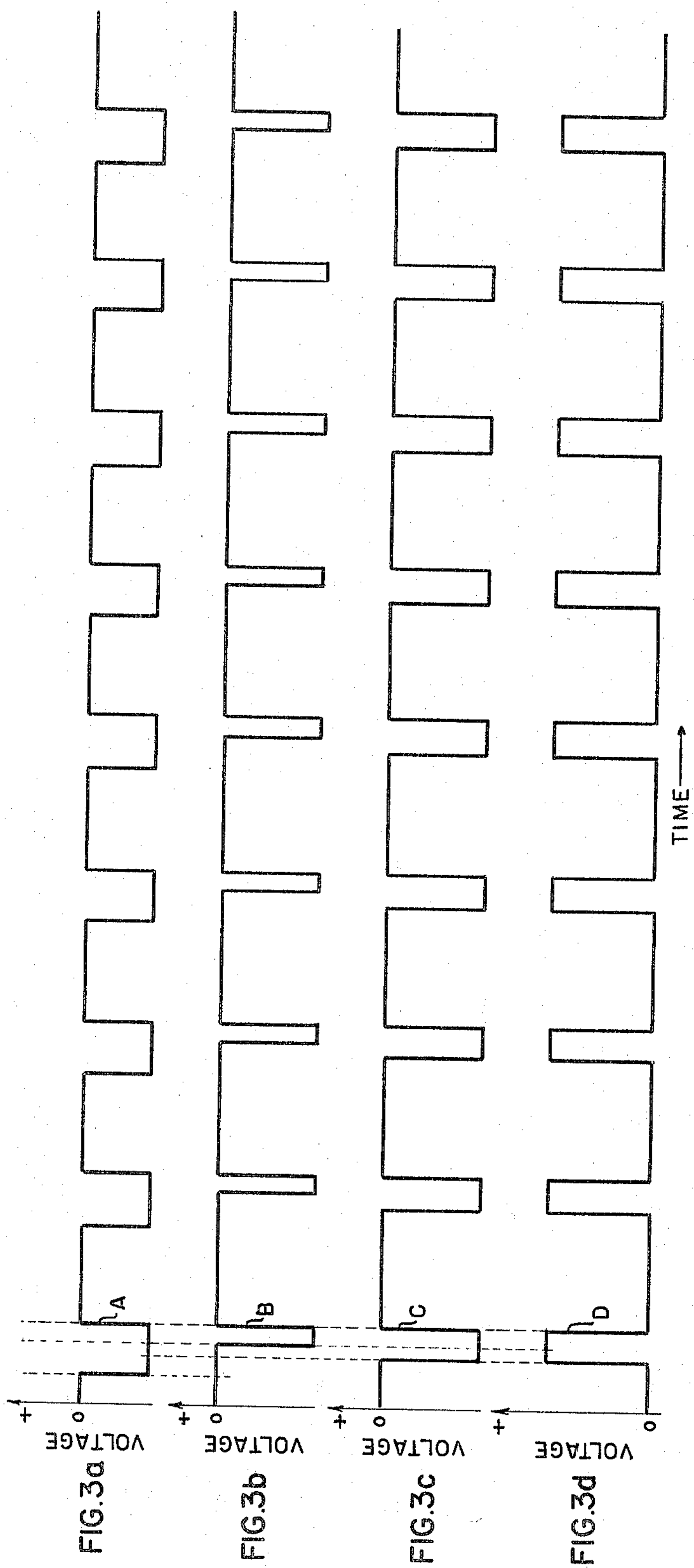

The portions of FIGURE 2 designated, V, represent the modulation of scanning beam 18 by the positively charged areas of target 16. Saturated black level in this waveform corresponds to a maximum value of return beam 19 which is obtained during the retrace or blanking interval by applying negative voltage pulses, A, through capacitance 26, to the target 16, thereby preventing electrons in beam 18 from landing on the target during the time duration of the pulses, A. Voltage pulses A are shown in FIGURE 3*a*.

As shown in FIGURE 2, the particular line scan has been examined for eight successive frames and has exhiibted peak video voltages designated $E_{P1}$ through $E_{P8}$. Over the first four frames the peak video voltage has descreased, which indicates that the peak luminous intensity of that portion of the scene viewed has also decreased. However, as previously explained, the shot noise present with the smaller video signal, $E_{P4}$, is the same as that present with the larger video signal, $E_{P1}$, since the magnitude of scanning beam 18 has remained unchanged even though, with regard to frame four, that magnitude is substantially larger than is necessary to discharge any area of the target 16 corresponding to the peak luminous intensity of the scene viewed. Consequently, the signal-to-noise ratio is degraded in transmitted scenes of peak luminous intensity such as that represented by frame four in FIGURE 2.

In accordance with an aspect of the present invention, as long as the peak luminous intensity of a scene viewed produces a small but finite orthicon output current or voltage across resistance 21, this minimum output can be measured and adjusted to have a given selected value such that the value of scanning beam 18 is sufficient completely to discharge the target 16 in positively charged areas representative of peak luminous intensity of the scene viewed. This, in effect, optimizes the signal-to-noise ratio. Such a system would include D.C. coupling through the amplification stages following the orthicon.

In accordance with another aspect of the present invention, novel apparatus for making such a measurement without a need for D.C. coupling through the video amplifier 22 is provided. This novel apparatus is provided in the event that insufficient gain were to be realized with practical D.C. amplifier circuits. Until now, it has been tacitly assumed that the control grid 23 in the image orthicon 10 simply provides the appropriate bias needed to obtain the desired maximum magnitude of scanning beam 18. However, in order to provide for measuring the maximum value of scanning beam 18, with A.C. coupling through video amplifier 22, as represented by capacitor 24, the scanning beam 18 is modulated to a reference level corresponding to the maximum or 100 percent modulation of this beam. To this end a pulse generator 25 of conventional construction which derives voltage pulses A, B, C, and D, shown in FIGURES 3*a*, 3*b*, 3*c* and 3*d*, respectively, applies voltage pulse B through capacitance 27 to the control grid 23. This pulse cuts off the scanning beam 18 during the retrace period and thereby produces the series of pulses, P, shown in FIGURE 2. Thus the cutoff of beam 18 produces a reference modulation level which is designated as the saturated white level. Pulse generator 25 is controlled by the conventional timing circuits used in deflection signal and scanning generator apparatus 28, which additionally provides scanning voltages for the horizontal and vertical deflection coils, or alternatively, electrostatic deflection plates 29 of orthicon 10.

The output signal of orthicon 10 is applied through an A.C. coupled video amplifier 22 to control apparatus 11, constructed in accordance with the present invention, to measure the difference between the peak modulation of a signal modulated electron beam, voltage $E_P$, and the peak magnitude of pulse P, voltage $E_S$.

To this end the voltage present across resistance 21 is applied to a conventional peak-to-peak signal detector 30 for detecting the peak amplitude of pulse P as measured from the saturated black level. This signal is also applied to peak-to-peak signal detector 31 of construction similar to detector 30. A voltage pulse C is coupled to detector 31 through capacitance 32 to disable it at least during the time occurrence of pulse P. Alternately, a voltage pulse D can be coupled to this detector to cancel out the voltage pulse P. As a result of either method detector 31 measures the peak modulation of the applied signal, voltage $E_P$, rather than the amplitude of pulse P. With reference to FIGURE 2, voltage $E_P$ is the output of detector 31 and voltage $E_S$ is the output of detector 30.

In accordance with one embodiment of the present invention, the detector outputs with proper polarity are supplied to a conventional automatic-gain-control distribution network 33 comprising, for example, resistances 34, 35, 36 and capacitance 37 thereby deriving an automatic control signal representative of the difference between the measured reference magnitude and the peak modulation hereinbefore described. In this embodiment, the time constants of detectors 30 and 31 and network 33 are so chosen so as to provide charge and discharge times long in comparison to the line scan and frame periods respectively. As a result, regulation of the scanning beam takes place over several frame periods. The automatic control signal so derived is coupled to control grid 23 of orthicon 10 through biasing resistances 38, 39 and 40 for regulating the magnitude of the scanning electron beam 18 to adjust the aforesaid difference to a predetermined value thereby to control a signal-to-noise performance characteristic of the signal generating system.

Figure 4:
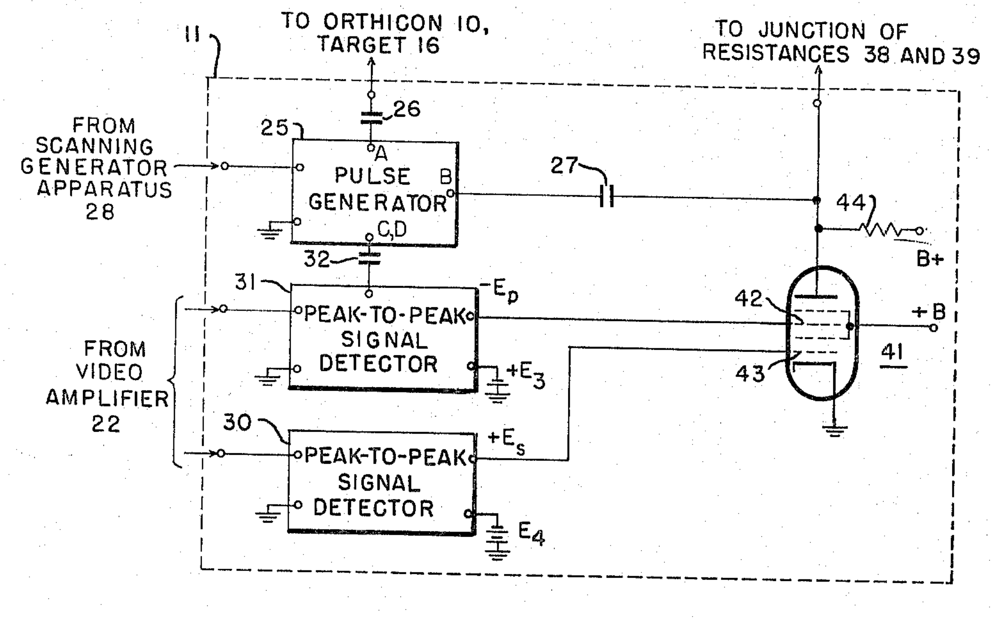
FIG. 4 shows another embodiment of control apparatus constructed in accordance with the present invention.

In accordance with another embodiment of the present invention an automatic control signal is derived from the ratio of the output signals developed by detectors 30 and 31. In this embodiment shown in FIG. 4 apparatus 11 includes a conventional tube circuit 41 having a pair of input electrodes 42 and 43 biased by voltage supplies $E_3$ and $E_4$ so that the input-to-output electrode transfer characteristic of electrode 42 is such that an input signal, for example voltage $-E_P$, supplied to this electrode produces a signal component in the output circuit, comprising for example resistance 44, that is proportional to the reciprocal of the input signal, while a signal, for example voltage $+E_S$, applied to the other input electrode 43 produces an output signal directly proportional to the input signal. When both input signals are present simultaneously, the output current product produced is proportional to the ratio of the applied signals. This type of circuit is described as an inverse modulator in "Color-Image-Reproducing Apparatus Utilizing Velocity Modulation," B. D. Loughlin et al., Patent No. 2,987,572, issued June 6, 1961.

This latter automatic control signal is coupled to the control grid 23 in the manner hereinbefore described for regulating the magnitude of a first beam 18 to adjust the derived ratio to a predetermined value thereby controlling a signal-to-noise performance characteristic of the signal generating system.

That the difference-representative control signal and the ratio-representative control signal are related to each other is seen by inspection of the following equations:

$$\Delta E = E_S - E_P \quad (1)$$

$$\frac{E_P}{E_S} = 1 \frac{-\Delta E}{E_S} \quad (2)$$

Moreover adjusting the measured difference or ratio to a predetermined value is seen, with reference to FIG. 2 to increase the magnitude of a scanning beam 18 for scenes of high peak luminous intensity and to decrease the magnitude of the beam 18 for scenes of low peak luminous intensity. The net result is automatically to control a signal-to-noise performance characteristic of the signal generating system.

In the overall functioning of the television system of FIG. 1 the output of video amplifier 22 is coupled to a television signal transmitter 45 thence to an antenna system 46 for radiation.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Control apparatus for an image signal generating system including an image orthicon having a scanning electron beam, a control electrode for controlling the magnitude of said scanning electron beam, and an image signal modulated return electron beam, comprising:

means for producing a reference modulation level in said return electron beam;

means responsive to said return beam for developing an output signal jointly representative of said reference modulation level and said image signal modulation;

means responsive to said output signal for deriving a control signal representative of the relative magnitudes of said reference modulation level and the peak image signal modulation level;

and means for coupling said control signal to the control electrode of said image orthicon for regulating the magnitude of said scanning electron beam to maintain a predetermined relationship between said reference modulation level and said peak image signal modulation level, therey optimizing the signal-to-noise performance characteristic of said system.

2. Control apparatus for an image signal generating system including an image orthicon having a scanning electron beam, a control electrode for controlling the magnitude of said scanning electron beam, and an image signal modulated return electron beam, comprising:

means for producing a reference modulation level in said return electron beam;

means responsive to said return beam for developing an output signal jointly representative of said reference modulation level and said image signal modulation;

means responsive to said output signal for deriving a control signal proportional to the difference between said reference modulation level and the peak image signal modulation level;

and means for coupling said control signal to the control electrode of said image orthicon for regulating the magnitude of said scanning electron beam to maintain a predetermined difference between said reference modulation level and said peak image signal modulation level, thereby optimizing the signal-to-noise performance characteristic of said system.

3. Control apparatus for an image signal generating system including an image orthicon having a scanning electron beam, a control electrode for controlling the magnitude of said scanning electron beam, and an image signal modulated return electron beam, comprising:

means coupled to the control electrode of said image orthicon for periodically cutting off said scanning electron beam to produce a reference modulation level in said return electron beam;

means responsive to said return beam for developing an output signal jointly representative of said reference modulation level and said image signal modulation;

means responsive to said output signal for developing a first signal proportional to the magnitude of said reference modulation level, and a second signal proportional to the magnitude of the peak image signal modulation level in said output signal, and for combining said first and second signals to derive a control signal proportional to the difference between said reference modulation level and said peak image signal modulation level;

and means for coupling said control signal to the control electrode of said image orthicon for regulating the magnitude of said scanning electron beam to maintain a predetermined difference between said reference modulation level and said peak image signal modulation level in said return electron beam, thereby optimizing the signal-to-noise performance characteristic of said system.

4. Control apparatus for an image signal generating system including an image orthicon having a scanning electron beam, a control electrode for controlling the magnitude of said scanning electron beam, and an image signal modulated return electron beam, comprising:

means for producing a reference modulation level in said return electron beam;

means responsive to said return beam for developing an output signal jointly representative of said reference modulation level to the peak image signal modulation;

means responsive to said output signal for deriving a control signal proportional to the ratio of said reference modulation level t the peak image signal modulation level;

and means for coupling said control signal to the control electrode of said image orthicon for regulating the magnitude of said scanning electron beam to maintain a predetermined ratio between said reference modulation level and said peak signal modulation level, thereby optimizing the signal-to-noise performance characteristic of said system.

5. Control apparatus for an image signal generating system including an image orthicon having a scanning electron beam, a control electrode for controlling the magnitude of said scanning electron beam, and an image signal modulated return electron beam, comprising:

means coupled to the control electrode of said image orthicon for periodically cutting off said scanning electron beam to produce a reference modulation level in said return electron beam;

means responsive to said return beam for developing an output signal jointly representative of said reference modulation level and said image signal modulation;

means responsive to said output signal for developing a first signal proportional to the magnitude of said reference modulation level, and a second signal proportional to the magnitude of the peak image signal modulation level in said output signal, and for combining said first and second signals in an electron device to derive at the output of said device, a control signal proportional to the ratio of said reference modulation level to said peak image signal modulation level;

and means for coupling said control signal to the control electrode of said image orthicon for regulating the magnitude of said scanning electron beam to maintain a predetermined ratio between said reference modulation level and said peak image signal modulation level in said return electron beam, thereby optimizing the signal-to-noise performance characteristic of said system.

6. Control apparatus constructed in accordance with claim 5 wherein said electron device is a vacuum tube having first and second input electrodes, wherein said first and second signals are coupled to the corresponding input electrodes of said vacuum tube, and wherein there is derived in the output of said vacuum tbe said control signal proportional to the ratio of said reference modulated level to said peak image signal modulated level.

References Cited by the Examiner

Luther: "Image Orthicon Automatic Beam and Gain Control," RCA TN–389, June 1960.

DAVID G. REDINBAUGH, *Primary Examiner.*

J. McHUGH, R. L. RICHARDSON, *Assistant Examiners.*